United States Patent [19]

Horsma et al.

[11] 4,085,286

[45] Apr. 18, 1978

[54] HEAT-RECOVERABLE SEALING ARTICLE WITH SELF-CONTAINED HEATING MEANS AND METHOD OF SEALING A SPLICE THEREWITH

[75] Inventors: David August Horsma, Palo Alto; Stephen Hunter Diaz, Los Altos, both of Calif.

[73] Assignee: Raychem Corporation, Menlo Park, Calif.

[21] Appl. No.: 601,344

[22] Filed: Aug. 4, 1975

Related U.S. Application Data

[63] Continuation-in-part of Ser. No. 509,837, Sep. 27, 1974, abandoned.

[51] Int. Cl.² .................... H02G 15/18; H02G 1/14; B29C 27/24; H05B 3/10
[52] U.S. Cl. ........................... 174/92; 156/49; 156/86; 156/275; 174/35 C; 174/DIG. 8; 219/505; 219/548; 219/553; 428/36; 428/913
[58] Field of Search ............. 174/DIG. 8, 84 R, 87, 174/88 R, 91–93, 138 F, 35 R, 35 C; 339/DIG. 1; 53/30 S; 156/49, 53, 54, 85, 86, 272, 275; 219/331, 504, 505; 264/25, 27, 230, 342 R, DIG. 71; 285/381, 423, DIG. 10

[56] References Cited

U.S. PATENT DOCUMENTS

| T905,001 | 12/1972 | Day | 264/230 X |
|---|---|---|---|
| 2,110,457 | 3/1938 | Wentz | 174/93 X |
| 3,243,753 | 3/1966 | Kohler | 219/331 UX |
| 3,274,302 | 9/1966 | Anderson et al. | 53/30 S X |
| 3,455,336 | 7/1969 | Ellis | 174/DIG. 8 UX |
| 3,705,950 | 12/1972 | Jirka et al. | 174/93 X |
| 3,717,746 | 2/1973 | Breitweiser | 174/DIG. 8 X |

OTHER PUBLICATIONS

Raychem Corporation publication entitled "New In-Line System for Communication Cable," dated 9-1971, 2 pp.

Primary Examiner—Laramie E. Askin
Attorney, Agent, or Firm—Lyon & Lyon

[57] ABSTRACT

A heat recoverable article is so configured that it can be positioned around a pipe or cable joint or splice which it is desired to encapsulate or seal. Means for sealing a splice involving a plurality of cables of the same or varying sizes are provided. The article includes a closure means for holding the article together after it has been positioned around the splice to be sealed. In a preferred embodiment, the inner surface of the article contains a heat activated adhesive or sealant to environmentally encapsulate the splice and the outer layer of the article is a heat recoverable insulating material. In a particularly preferred embodiment, the article has self-contained heating means, which heating means comprises a polymeric material having dispersed therein a conductive filler, said heating means exhibiting a positive temperature coefficient of resistance so as to render it self-regulating.

41 Claims, 21 Drawing Figures

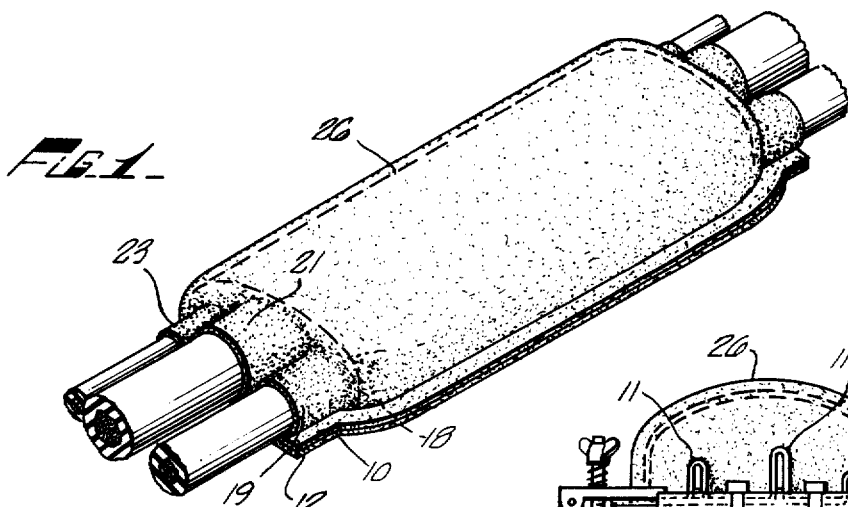
FIG. 1
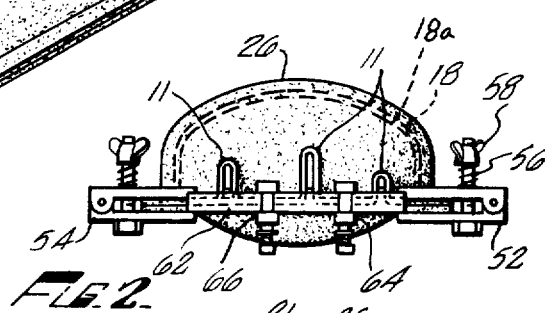
FIG. 2
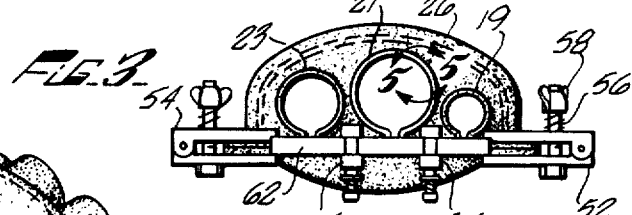
FIG. 3
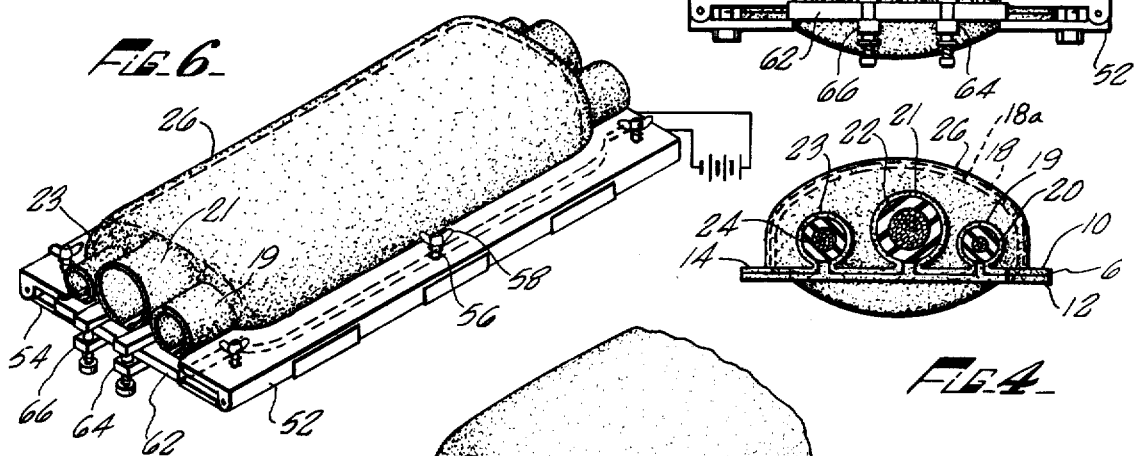
FIG. 6
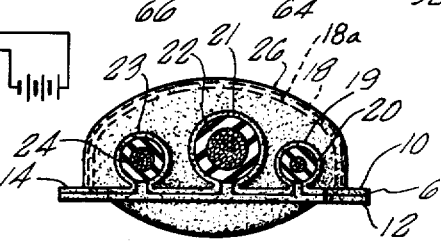
FIG. 4
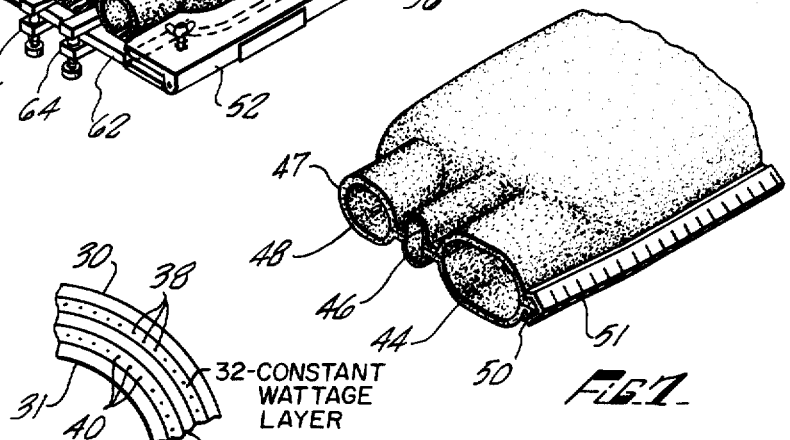
FIG. 7
FIG. 5
30
38
32 - CONSTANT WATTAGE LAYER
31
40
34 - PTC RESISTANCE LAYER
36 - CONSTANT WATTAGE LAYER

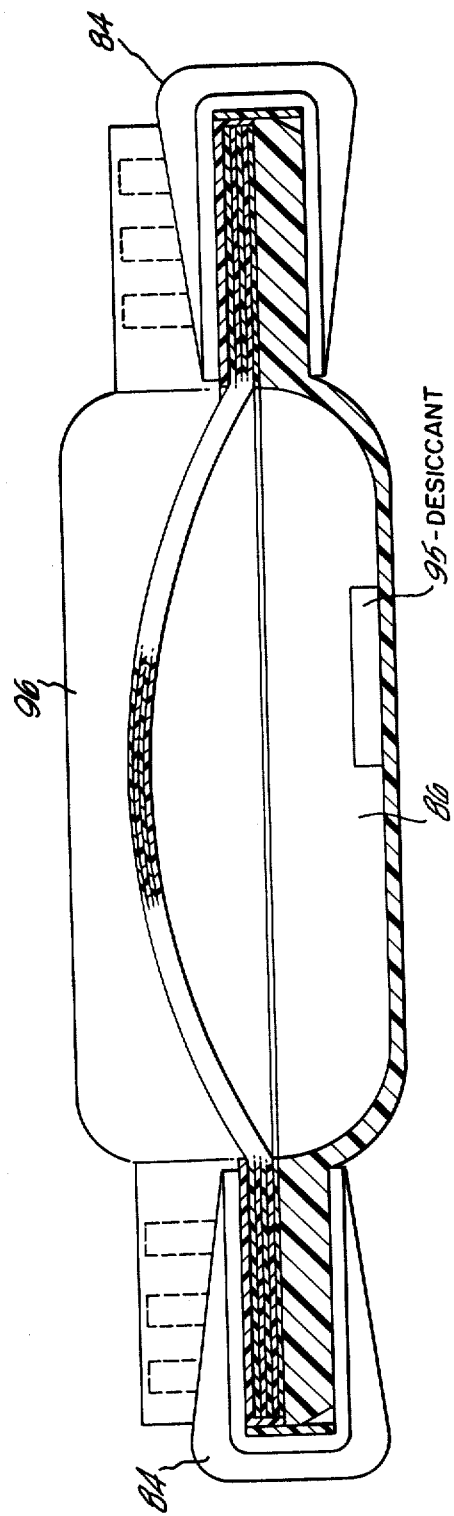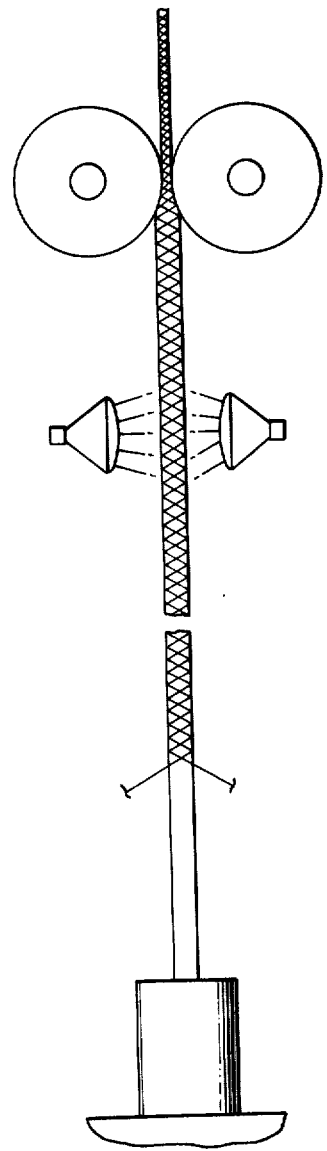

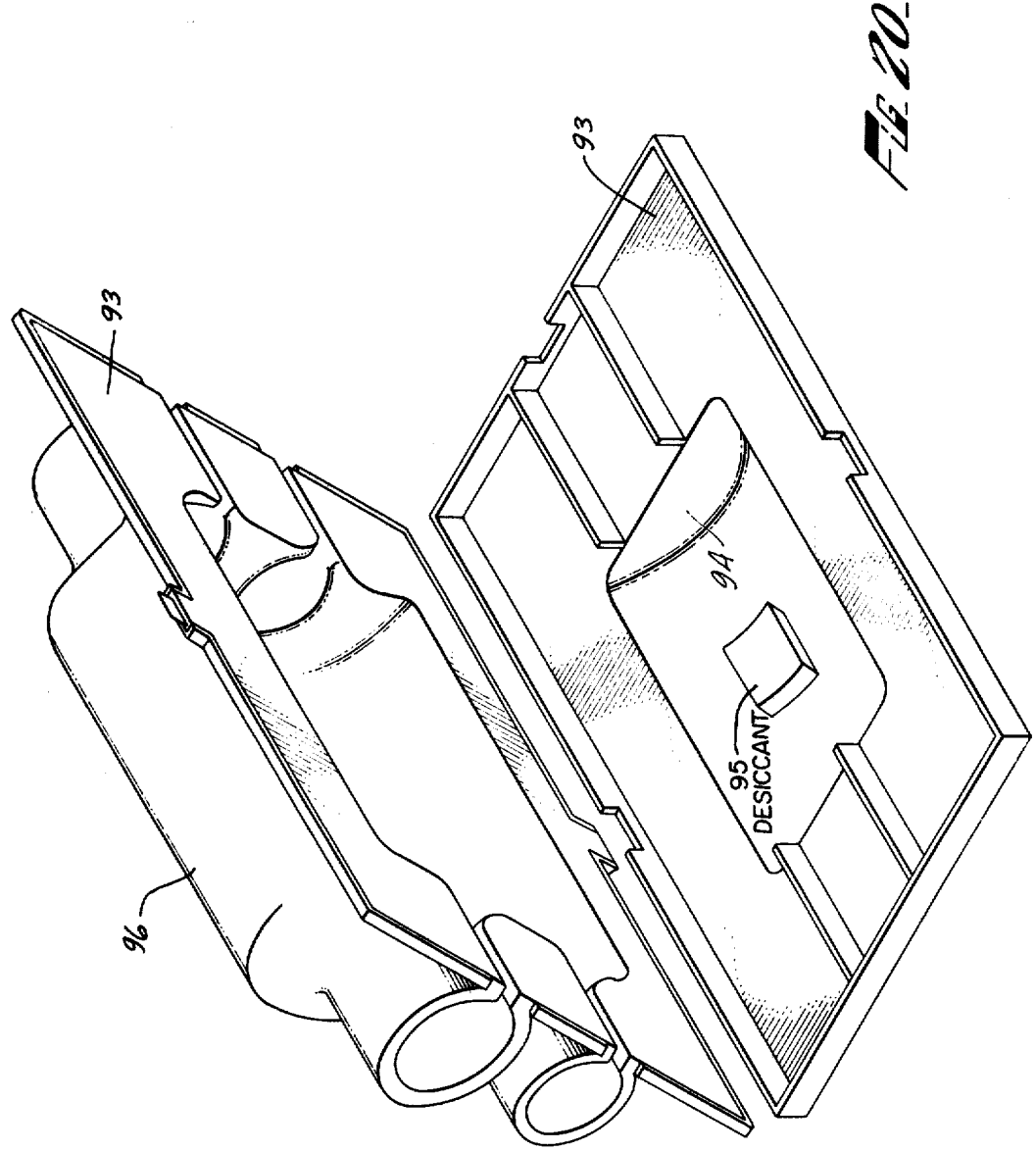

HEAT-RECOVERABLE SEALING ARTICLE WITH SELF-CONTAINED HEATING MEANS AND METHOD OF SEALING A SPLICE THEREWITH

This application is a continuation-in-part of application Ser. No. 509,837, filed Sept. 27, 1974, now abandoned.

BACKGROUND OF THE INVENTION

This invention relates to heat recoverable articles and more particularly to heat shrinkable articles that can be positioned around a cable, pipe, or connector at a joint or splice and then be caused to heat recover in place to thereby encapsulate said splice.

There are many applications where it is desirable to provide a sealing, insulating or protective encapsulating or enclosing member for elongated objects such as cables, pipes or the like. Such encapsulation is particularly important where pipes, cables and the like are joined or spliced, particularly when a joint involving a plurality of pipes, cables, etc. is involved. In many instances, the ends of elongated objects (hereinafter the term cables will be used, although the invention is, of course, useful for enclosing or encapsulating pipes, cables, ducts, conduits and the like elongated substrate members) are not conveniently accessible to a sealing member having a tubular configuration, and to place such a tube thereover, the elongated object must be disconnected or displaced from its original position. To overcome this shortcoming of heat recoverable tubes, closure members suitable for wrapping around the elongated objects have been developed. See for example, U.S. Pat. Nos. 3,379,218 to Conde and 3,455,336 to Ellis or U.S. Pat. No. 3,770,556 to Evans, all assigned to the same assignee as the present application. These so-called "wrap-around" closures can be installed around an elongated member without access to a free end thereof. There is nevertheless a significant need for a closure, hereinafter referred to as a "splice case," suitable for enclosing electrical cable joints, splices, and the like, which provides effective environmental protection, in particular, for splices involving more than two incoming cable ends and/or splices between different sizes of cables but which can be applied without access to a free end of the cable.

This invention is directed to such a heat-recoverable, splice case which can, in optional embodiments, accommodate a plurality of cables of differing size, i.e., outside diameter, which can be removed and reapplied to a splice and which does not require access to a free end of the cable. The present design is not referred to as a "wrap-around" since it encapsulates a splice in a somewhat different fashion from the aforementioned "wrap-around" closures. In alternative embodiments the splice case of the present invention utilizes either a "clam shell" or separate base plate and cover member design.

In one embodiment the present invention contemplates a splice case which will recover and encapsulate a cable or other splice when subjected to an external heat source such as a propane torch or hot air blower.

For reasons hereinafter set forth, in a preferred embodiment the splice case of the present invention includes integral heating means. That is, the splice case contains an integral electrical resistance heating element which, when connected to an external electric current source, generates sufficient heat to cause the splice case to recover and encapsulate the splice. Many of the applications for such splice cases contemplate in-field use, where the location of the splice is difficultly accessible or in a potentially hazardous environment, and great care must be taken in installing the splice case.

In the connection of overhead telephone cables, or in underground mines which may contain flammable gases, the use of an open flame torch is often not only dangerous, but sometimes strictly prohibited. Under such circumstances a wrap-around closure, i.e., splice case, which does not require the application of external heat, particularly a flame, would be particularly advantageous. Considerable effort has heretofore been expended to devise a closure means which is not only economical to fabricate but quick, easy, and safe to install. To this end it would be desirable to have a heat recoverable splice case which does not require an outside heating source, but instead may be caused to recover by connection to an electric power source, such as a 12 or 24 volt battery, or a 115 volt A.C. outlet, and which when connected to such a power source, will cause heat recovery of the splice case and also activation of an adhesive or sealant on the inner surface thereof.

In formulating conductive heating compositions for use in the splice cases of this invention, uniform heating of the composition is important. In addition, for applications where the heating element must cause heat activation of an adhesive or sealant, as well as heat recovery of the article, relatively high temperatures on the order of 120° C to 200° C must be not only obtained, but also carefully controlled. If higher temperatures beyond that necessary for heat recovery of the splice case and adhesive activation occur, then permanent damage to the sealing article, i.e., the splice case, and/or to the part to be sealed, e.g., the substrate cable, may result, such damage frequently not being apparent by visual inspection of the recovered splice case and immediately adjoining areas of the cable.

Of course, thermostats and/or other heat control devices may be employed to control the temperature of the recovered article. But for many applications, this defeats the purpose of using a self-contained. i.e., self-heating, closure system, in that expensive, sensitive and/or bulky external temperature control devices must be employed in what are sometimes virtually inaccessible places. Moreover, the temperature sensed by the thermostat is only that of its immediate environment. Other areas of the case may be at considerably lower or higher temperatures.

In recent years a new approach for electrical heating appliances has seen the use of self-regulating heating systems which utilize plastic materials exhibiting PTC (positive temperature coefficient) of resistance characteristics. Such materials comprise crystalline thermoplastics plus a conductive particulate filler.

The distinguishing characteristic of these PTC materials is that upon reaching a certain temperature, a rapid rise in resistance occurs. The temperature at which the resistance increases sharply is often designated the switching temperature $(T_s)$ since the current at that point tends to switch off, thereby preventing permanent damage through further temperature increase to the heating article itself or any article being heated thereby.

Although a number of theories have been propounded for the sharp rise in resistance of the PTC material at about its crystalline melting point, it is generally believed that such behavior is related to the difference in thermal expansion of the conductive filler and the thermoplastic matrix materials at the melting point.

For a more detailed discussion of a number of alternative mechanisms to explain the PTC phenomena, see "Glass Transition Temperatures as a Guide to the Selection of Polymers Suitable for PTC Materials," J. Meyers, *Polymer Engineering in Science,* November, 1973, vol. 13, no. 6.

Most self-regulating heating apparatus utilizing a PTC material contemplate steep $R = f(T)$ curves at about the $T_s$ temperature so that above this certain temperature the device will in effect completely shut off, while below this temperature, relatively constant wattage output at a given voltage is achieved. At low temperatures, the resistance is at a relatively low and constant level and thus the current value is relatively high for any constant voltage ($E = IR$). This power is dissipated as Joule heat ($I^2R$), thereby warming up the material. The resistance stays at this relatively low level until the $T_s$ temperature, where a rapid increase in resistance occurs. With the increase in resistance, there is a decrease in power, thereby limiting the amount of heat ($I^2R$) generated and for extremely steep $R = f(T)$ curves, heating is in effect stopped. Then, upon a lowering of the temperature, the resistance drops, thereby increasing the power output.

Thus, when an applied voltage is directed across a PTC heating element, the Joule heat, ($I^2R$) causes rapid heating of the PTC element up to its switching temperatures, after which little additional temperature rise will occur due to the steep increase in resistance. On account of the steep resistance rise, the heating element will theoretically reach a steady state at about the switching temperature, thereby self-regulating the heat output without resort to fuses or thermostats.

Thermoplastic PTC materials contemplated by the prior art are highly crystalline and exhibit a $T_s$ at about the crystalline melting point, however, most such materials in fact show a "curl over" effect, i.e., the resistance drops again at temperatures much above the melting point. This decrease in resistance above the melting point is generally undesirable, especially in cases where the PTC material is itself heat recoverable, or is used in intimate proximity with a heat recoverable material to effect recovery thereof, since under such circumstances it is preferred to heat the heat shrinkable material as rapidly as possible up to its melting point (i.e., by means of high power densities) and thereafter keep the heater temperature very slightly above the melting point of the thermoplastic constituent(s) of the heater to facilitate rapid and effective shrinkage of the heat recoverable article.

However, heat recoverable articles, such as are comprehended by the instant invention, are intended in use to encapsulate and environmentally seal splices between, for example, telephone cables, by shrinking down onto and bonding securely to the cable jacket which generally comprises a low melting, partly crystalline, thermoplastic composition such as a carbon black loaded ethylene-vinyl acetate polymer. Such cable jackets are almost always uncrosslinked and, therefore, will flow and distort readily if the heater causes said jackets to heat to too high a temperature (i.e., over their melting points) during the time at such temperature needed to activate the adhesive. Even more serious results can occur with a heater which does not very positively "shut off" if, as may happen, the artisan making the splice forgets, or otherwise omits, to disconnect the battery (or other electrical power source) from the heat shrinkable article. Under such circumstances, it is conceivable that the PTC heater could remain energized for periods of 1 hour, or even more, for example, although the encapsulation process may take only, for example, 10 minutes. The above considerations are made even more critical if, as often happens, the individual conductors within telephone cables are each insulated with similar thermoplastic compositions. Any distortion of such conductor jackets is unacceptable, as it causes that section of the cable to become nonfunctional. Thus, there exists a need for a heater for articles such as those disclosed and claimed in the instant application which undergo a steep and extensive increase in resistance above the $T_s$ of the article heater element and whose resistance continues to rise as the temperature of the heater is increased above the melting point of the thermoplastic constituent, rather then "curling over" i.e., declining more or less steeply as occurs with most, if not all, prior art heaters. It should be noted that the "curl over" phenomenon was not generally recognized by most prior art workers.

Furthermore, it has heretofore been generally believed that conductive polymeric materials exhibiting PTC characteristics did not have sufficient heating capacity to cause recovery of relatively thick sections of heat recoverable materials as contemplated for the splice case of this invention, nor the capacity to activate the high temperature adhesives also contemplated by this invention.

The shortcomings of the prior art PTC material for articles such as the splice case of the current invention can be overcome by the use of the compositions disclosed in co-pending, commonly assigned, application Ser. No. 510,035, filed Sept. 27, 1974 (now abandoned), and application entitled "Positive Temperature Coefficient of Resistance Compositions" filed on even date herewith having Ser. No. 601,639 and by utilizing constructions of the type set forth in application Ser. No. 510,036 filed Sept. 27, 1974 (now abandoned) and in application Ser. No. 601,638 concurrently filed herewith entitled "Layered Self-Regulating Heating Article." However, it should be noted that although prior art PTC materials are preferred, they are suitable for use in the splice case of the present invention under many circumstances.

During the operation of telephone cables, especially when the individual conductors are wrapped with a paper-based dielectric, it is required that moisture be excluded since, if the moisture content of the wire insulation increases beyond a certain relatively low, critical level, the electrical characteristics of the wire are unacceptably impaired. For this reason it is customary when prior art telephone cable splice cases are installed for the artisan to place in the case just prior to assembly, a small paper bag of desiccant (usually silica gel) in an amount sufficient to maintain the interior humidity of the case at a very low level over the lifetime of the splice case, whatever the outside humidity. In a typical instance, about 2 oz ($\approx 50$ g) silica gel might be used. As might be expected, this technique is appallingly craft sensitive, since besides outright ommission to place the bag in the completed splice case structure, the bags (which are customarily sealed for shelf storage while awaiting use) are sometimes left in an unsealed condition for extended periods of time before emplacement, or, in the extreme, even dropped into water or wet mud and emplaced nonetheless. A preferred embodiment of this invention alleviates this problem, as will be explained hereinafter.

It is an object of this invention to provide a heat recoverable closure system which effectively encapsulates a plurality of cables of varying size.

It is a further object of this invention to provide a heat recoverable closure assembly which may be inserted over or wrapped around cables and which has sufficient self-heating capacity to seal such cables without resort to outside heating sources.

It is another object of this invention to provide a reliable self-heating closure system which will self-regulate and not overheat thereby causing permanent damage to the article encapsulated, nor on the other hand shut off at a temperature less than that which it was designed to reach.

Further objects and advantages of the present invention will be apparent from the more detailed discussion and description thereof which follows.

SUMMARY OF THE INVENTION

These and other objects are accomplished by providing a heat recoverable article, i.e., splice case, preferably having self-contained heating means, said heating means preferably incorporating a positive temperature coefficient of resistance (PTC) material so as to regulate the heat output without resort to extraneous temperature control devices. The article is so configured that it can be positioned around a splice and then caused to heat recover and seal that splice. The terminology "self-contained heating means" or "self-heating" signifies that the splice case having such feature incorporates an electric resistance heating unit so that on connection to an electric power source, e.g., a battery or alternating current, sufficient heat will be generated to shrink the shrinkable portion of the splice case and activate (e.g., melt) any adhesive present in the splice case. A splice case in accordance with the instant invention but not having the self-heating feature does not incorporate an electric resistance element and shrinking and adhesive activation are achieved by use of an external heat source.

The optional self-contained heating means will suitable comprise a polymer having dispersed therein sufficient conductive filler so that it is capable of conducting current at a given voltage, such as 12 or 24 volts from a battery, and also exhibit sufficient resistance at its operating temperature so that its $I^2R$ heat output is capable of causing relatively thick sections of heat recoverable materials, on the order of several hundred mils thick, to heat to their recovery temperature and recover about the splice to be encapsulated. In addition, the heating means should be capable of giving sufficient heat output to activate high temperature thermoplastic or thermosetting adhesives or sealant.

BRIEF DESCRIPTION OF THE DRAWING

FIG. 1 is a perspective view of a self-heating, heat recoverable article, i.e., a splice case, into which has been positioned and joined a plurality of cables of varying dimensions.

FIG. 2 is an end view of the article of FIG. 1 prior to expansion to its heat unstable, i.e., heat recoverable form.

FIG. 3 is an end view of the article after expansion to its heat unstable form.

FIG. 4 is an end view of the article after it has been caused to heat recover about a set of cables.

FIG. 5 is taken along line 5—5 of FIG. 3 showing in detail the layered construction of the article.

FIG. 6 is a perspective view of the article prior to cable insertion.

FIG. 7 is a perspective view of an alternate embodiment.

It should be noted that with the exception of FIG. 5, FIGS. 1 through 7 are illustrative of the splice case whether or not it incorporates self-heating means. FIG. 5 shows the layered construction wherein the splice case incorporates self-heating means.

FIGS. 8 through 11 show the structure of an especially preferred embodiment of the splice case.

FIG. 8 is a cross section at one end of the splice case.

FIG. 9 is a perspective view of one end cut away to show the details of the structure.

FIG. 10 is a perspective view of the splice case from below the nonheat recoverable base member.

FIG. 11 is a longitudinal cross section of the splice case showing details of the internal cavity.

FIGS. 12 through 19 show details of the preferred method of construction of the splice case.

FIG. 12 illustrates how the preferred braid electrodes may be formed.

FIG. 13 shows how the electrodes are positioned over the attached to the side buss bar electrodes.

FIG. 14 shows the various layers (cut away to facilitate understanding) of the blank for the heat recoverable member positioned in a jig prior to lamination.

FIG. 15 shows the blank being formed into the basic shape for the heat recoverable member.

FIG. 16 shows the heat recoverable member in its heat stable configuration after being crosslinked.

FIG. 17 shows the construction of the reinforcing flanges for the ends and sides of the heat recoverable member.

FIG. 18 shows the flanges being applied to the heat recoverable member positioned in a jig prior to expansion.

FIG. 19 shows the heat recoverable member at the end of the expansion step.

FIG. 20 shows the upper and lower members of the splice case in perspective so as to show additional details of the interior.

DETAILED DISCUSSION OF THE DRAWINGS

Figure 8:
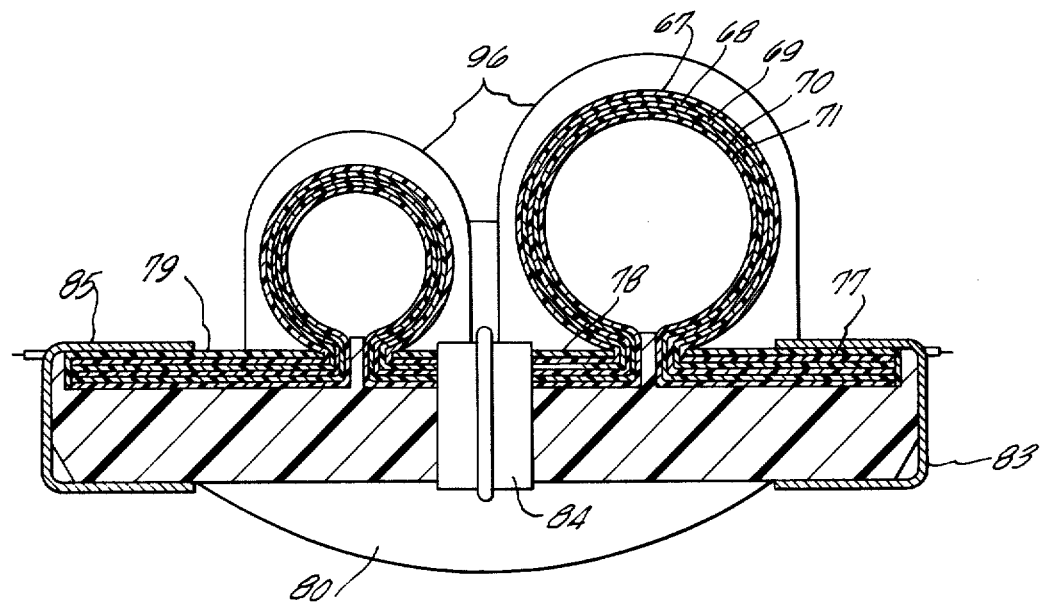

Referring to the Figures, FIG. 1 shows a heat recoverable closure apparatus in accordance with this invention, adapted for receiving a plurality of cables and having contained therein an enlarged central section for accommodating a splice joint of the cables. Such a configuration is particularly suited for low voltage telephone cables wherein a plurality of cables must be joined quickly and efficiently at minimum cost.

The apparatus shown in FIG. 1 may be entirely made of a heat recoverable material, preferably having layered therewith a self-heating composition, as shown in FIG. 5, which will be discussed in more detail hereafter. Alternatively, only that portion of each end of the splice case comprising the folds, i.e., that portion of the splice case between the respective ends thereof and dashed lines 18 can be made heat recoverable with the center portion being non heat recoverable. The layer or layers of heat recoverable material are cross linked as, for example, by irradiation so as to render them heat recoverable. The heat recoverable layer 10 is positioned in its stable, unexpanded state with folds 11 as shown in FIG. 2. The unexpanded folds can, of course, take on any configuration, including the general configuration of the cable provided that a sufficient excess of material for expansion is allowed. The folds are expanded by known techniques to a dimension greater than the diameter of the cables to be sealed, as shown in FIG. 3. As best seen in FIGS. 3 and 4, the openings may be of varying dimensions depending upon the size of the cable which is to be inserted, although it should be kept in mind that one size opening can recover over and seal a wide range of cable sizes. The heat recoverable layer 10 is mated with a bottom portion of the splice case 12 which is obviously not heat recoverable although as shown, for example, in FIG. 7, it can be heat recoverable in some embodiments. Bottom portion 12 may serve as a permanent mounting for the cable splice, giving rigidity to the system. Alternatively, 10 and 12 may be hinged on one side, as at 14, (FIG. 4) with a closure means at the opposite side 6. Alternatively, where 10 and 12 are formed from the same material, they can be integral at 14, utilizing a closure at 6, or, 10 and 12 can be separate parts separated at both 14 and 6 in which case heat shrinkable part 10 is merely lifted from part 12 for insertion of the cables. If desired, 10 and 12 can suitably have reinforcing strips embedded therein along the long axis thereof, preferably adjacent the sides 14 and 6. Such strips can also serve as current carrying bus-bars.

In sealing cable splices in accordance with this invention, portions 10 and 12 are separated and cables 20, 22 and 24 are placed therein. Referring more specifically to FIGS. 2, 3 and 6, where parts 10 and 12 are neither integral nor hinged, a clamping device such as the hinged clamps 52 and 54 are utilized, such clamps being tightened via the bolt, wingnut arrangement 56 and 58. The clamps may serve to maintain layers 10 and 12 together during expansion (FIG. 2) as well as during insertion of the cables and recovery thereover (FIG. 4). Although such clamps could form a permanent part of the installation, they are preferably removed after installation and an adhesive such as, for example, that described in U.S. Pat. No. 3,770,556 is used to permanently seal the edges.

Also, at the ends, proper spacing between cables is most suitably assured via a clamping device. As best seen in FIG. 6, this contemplates the use of a plate separator 62 having openings therein to accomodate folds 11 (FIG. 2), such plate tightly sealing layers 10 and 12 via clamps 64 and 66 during the expansion and sealing operations.

To add strength and to further protect the system, and where necessary to provide moisture vapor transmission protection or radio frequency shielding, the cable splice itself can optionally be encapsulated within a rigid can, having an outline defined by dashed lines 18 and 18a located beneath the central portion of the heat recoverable member generally designated 26 in FIG. 1. Where the central portion 26 is heat recoverable, it will conform to the shape of the can which can suitably be fabricated of any rigid material, including metal or molding plastic. The end openings 19, 21 and 23 are adapted to receive individual cables of varying dimensions. The other end of the heat recoverable member will generally contain openings of similar dimensions to accommodate the cables to be joined, although all of the openings may be confined to one side.

Where a rigid can is employed for covering the splice, sealing at the central portion via the heat recoverable member may not be necessary. Therefore, as heretofore indicated, the heat recoverable portion of the article of this invention can be limited to the end portions so that it will seal the individual incoming cables up to the can. In this case, the central portion, 26, can be of non-recoverable material, or if recoverable, need not be caused to recover. Alternatively, the material need not extend across the can so that the can is allowed to remain exposed, or only an insulation layer such as layers 30 or 31 of FIG. 5 need extend across the can with remaining layers being confined to the ends.

Referring more specifically to FIG. 5, the heat recoverable closure preferably comprises a layered self-heating composite having electrodes embedded therein, such electrodes being connectable to a power source such as a battery or conventional alternating current outlet. A particularly suitable layered composite is fully described in copending, commonly assigned, concurrently filed Patent application, entitled "Layered Self-Regulating Heating Article," Ser. No. 601,638 and in Application Ser. No. 510,036 filed Sept. 27, 1974 (now abandoned). The disclosures of the aforesaid pending applications are incorporated herein by reference. Briefly, the composite consists of an outer insulating layer, 30, which is heat recoverable. Layer 34 comprises a polymer or polymer blend, such as a blend of a highly crystalline polyolefin and ethylene-propylene rubber, having dispersed therein conductive carbon black. Layer 34 preferably exhibits positive temperature coefficient of resistance properties so as to closely regulate the heating of the unit. Layer 34 is preferably interleaved between constant wattage output layers 32 and 36 which may also be polymer blends having carbon black dispersed therein. However, these layers preferably yield constant wattage outputs at a given voltage over a wide temperature range and do not exhibit significant positive temperature coefficient of resistance properties. An inner insulating layer 31 may also be provided. Layers 31, 32, 34 and 36 are preferably also heat recoverable. The inner layer can advantageously contain an inwardly disposed adhesive coating for bonding and sealing to the cable.

Embedded in the constant wattage layers 32 and 36 are electrode grids 38 and 40, such grids being connected to opposite sides of a battery terminal as generally shown in FIG. 6. This configuration causes the current to pass through the PTC layer 34 from electrode 38 to electrode 40. A preferred type of electrode design and configuration is described in copending, concurrently filed U.S. Patent Application entitled"Self Heating Article with Fabric Electrodes," Ser. No. 601,549 (now abandoned in favor of a continuation having Ser. No. 735,958 filed Oct. 27. 1976).

Passage of current through, as opposed to across, a PTC layer is preferred for more uniform heating. More specifically, when the voltage is applied along the plane of the PTC layer, localized heating along certain conductive paths may result causing non-uniform heat output across the entire layer. This, in turn, can cause an even greater problem, rendering the entire heating device useless for a majority of its heating cycle. If the localized heating reaches the $T_s$ temperature along a line transverse to the current path, it will prevent the flow of current across the path, in effect causing the heating device to shut down until the temperature of the thus formed "hot-line" drops below the $T_s$ temperature. In other words, the "hot-line" across the layer between end electrodes effectively shuts down the heating device even though only a small surface area of the layer has achieved the $T_s$ temperature. This renders the heater so inefficient that it appears to exhibit a very low heating capacity. This hot-lining problem can be minimized by layering the PTC material between electrodes, thereby minimizing the length of the conductive paths across which hot-lining can occur. For maximum efficiency with minimum current path, the length to thickness ratio of the layer should be minimized. However, because of the short current path, and limited surface required for some applications, inadequate heating for such a configuration may occur at lower power inputs. To remedy this, a material giving a constant wattage or Joule heat output, at a given voltage, i.e. a material not having PTC characteristics, layers 31 and 36, is advantageously layered with the PTC layer so that the composite exhibits excellent heating effectiveness yet is self-regulating, without hot-lining. For a more thorough discussion of the advantages of applying a current through the layer, as opposed to along its length, and fabricating a layered composite, see copending, concurrently filed Patent application, "Layered Self-Regulating Heating Article" Ser. No. 601,638, assigned to the same assignee as the present invention.

For a more detailed discussion of suitable PTC compositions which are preferably employed for layer 34 for relatively high temperature applications, see copending, concurrently filed, commonly assigned application entitled "Positive Temperature Coefficient of Resistance Compositions," Ser. No. 601,639, pending application, U.S. Ser. No. 510,035 filed Sept. 27, 1974 (now abandoned) and copending, concurrently filed U.S. Pat. application Ser. No. 601,427 entitled "Temperature Overshoot Heater," now U.S. Pat. No. 4,017,715.

Referring to FIG. 7, an alternate embodiment of the present invention is shown. Such a configuration may be formed and expanded out of a single sheet of material, generally having the layered configuration of FIG. 5. After inserting the cables as previously described through openings 44, 46, and 48, the apparatus is closed by any suitable closure means 51 at 50. Such apparatus may, of course, be made to conform to various cable diameters and shapes as shown. It can be a "clam shell" having a closure means at 50 and self-hinging at 47.

Figure 9:
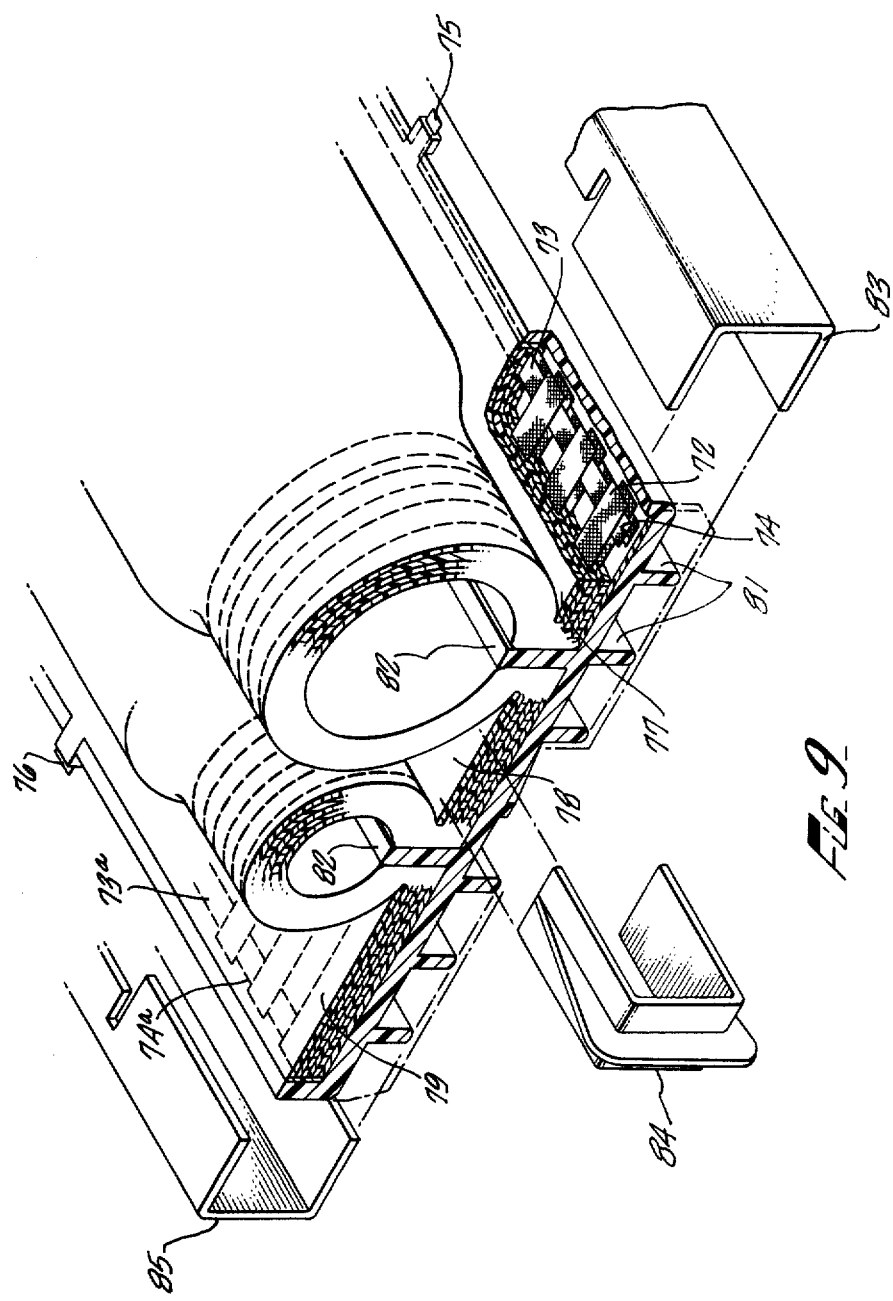

An especially preferred embodiment of the invention is illustrated in cross-section in FIG. 8. It consists of upper and lower members 96 and 80. The upper member 96 consists of an outer splice case shell 67 affixed firmly to a heater which consists of outer and inner layers of constant wattage material 68 and 70 and a core layer of PTC material 69. To the inside surface of the inner constant wattage layer 70 is affixed an adhesive layer 71. As shown in greater detail in FIG. 9, embedded in the constant wattage layers are flexible and compliant electrodes 72 which may be advantageously formed from braided wires. Each heat shrinkable end fold contains three electrodes of each polarity, opposed to each other and running transverse to the long axis of the case. Electrodes of the same polarity are connected (as by welding, soldering, or gluing with a conductive adhesive at the areas of intersection) to buss electrodes 73 and 73a, and 74 and 74a running down the length of each side of the case. Electrodes 73, 73a, 74 and 74a may be constructed from wire braid or thin metallic strip, optionally perforated.

Figure 10:
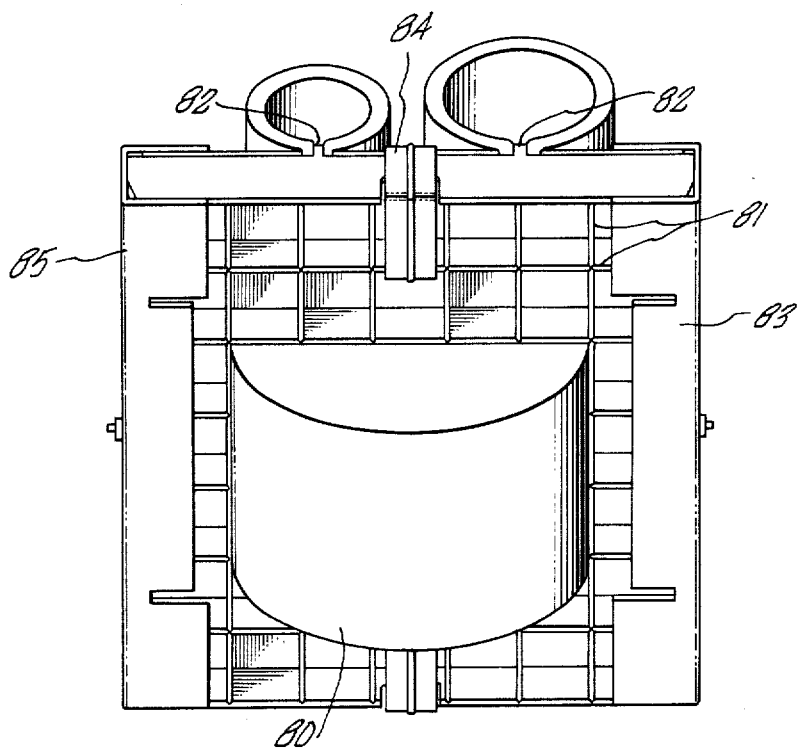

Referring again to FIG. 9, to the mid portion of electrode 73 on one side and to the mid portion of electrode 74a on the other side are affixed tabs 75 and 76 adapted for easy connection to an electrical power source. Referring again to both FIGS. 8 and 9, on the top of the primary heat shrinkable layer along each side and between the heat recoverable end fold structures are attached (as by gluing or otherwise adhering) reinforcing flanges 77, 78 and 79, which may be fabricated from any suitably rigid material. Especially suitable materials include metals, and engineering thermoplastics such as polycarbonate, ABS or SAN resins and filled polymers such as polyamides or polyolefins. Especially preferred is glass filled nylon. The lower member 80, which is not heat recoverable, preferably has external ribs 81 for increased rigidity and, optionally, internal ridges 82 corresponding to and adapted to be mated with the open sides of the heat recoverable folds as also shown in FIG. 10. The splice case may be assembled by bringing the upper and lower members together and securing with the spring clips 83, 84 and 85 suitably constructed of similar materials to flanges 77, 78 and 79.

It should be noted that a variety of closure means for the splice case can be employed. The closure should be such as to withstand the heat recovery step at the temperature of recovery. For various mechanical closures, see Conde, U.S. Pat. No. 3,379,218, Ellis, U.S. Pat. No. 3,455,336 or as described in copending, commonly assigned, Jervis application Ser. No. 510,034 filed Sept. 27, 1974 (now abandoned). Also, an adhesive, as previously discussed, can be used.

The methods of splice encapsulation provided for in the instant invention differ substantially from and thereby avoid or otherwise solve some of the deficiencies which characterize prior art splices. For example, in one of the preferred embodiments of the instant invention, the heat recoverable folds when positioned around the substrate, i.e., cable, enfold said substrate in such a manner that the opposing heat recoverable surfaces do not come in contact with one another but butt up against opposing surfaces of, for example, long fingers forming ridges on the mating surfaces of the non heat recoverable base member. The forming of the closure or splice case out of the combination of a heat shrinkable and a non heat recoverable member as in other preferred embodiments so that the areas which butt together to define the cavity containing the cable splice are themselves not heat shrinkable is another significant departure from the prior art as will be apparent from the following more detailed discussion.

When a heat-recoverable member is folded or wrapped around a substrate and shrunk down, it has been long realized that the region in which the heat recoverable article is brought together and secured with a closure member constituted an area of weakness both mechanically and in its resistance to the environment, for example, to penetration of water. In the above mentioned Ellis patent, attempts were made to solve this problem by the use of an overlapping design with a flap under the abutting edges of the heat recoverable member and secured to the overlying layer by an adhesive to provide a long leakage path. However, the solution of Ellis fails if the substrate does not provide a firm foundation against which the heat recoverable enclosure can press the flap so as to cause the adhesive to flow and wet the faying surfaces. When this factor is added to the difficulty of constructing a multiple entry splice case having overlapping heat recoverable regions, it can readily be seen that Ellis, while extremely useful in many instances, does not solve all the problems which the instant invention solves. Jervis seeks to solve some of the same problems as Ellis by providing a closure method wherein the recovery forces cause the abutting surfaces to press against one another, but his approach suffers from the disadvantages that the abutting surfaces in the closure region after the heat recoverable member has been shrunk around the cable, define an approximately triangular channel down into the joint and thus under certain circumstances can still constitute a weak region, as hereinabove described. This can become significant if the substrate e.g. cable, has a diameter close to the fully recovered diameter of the sleeve which would correspond to the fold of the instant invention. These problems are solved in a suprisingly simple and highly effective manner by the instant invention. The optional provision of an intervening finger on the non heat recoverable base member in combination with the clips and flanges on the heat recoverable member, which flanges can be used precisely because the heat recoverable member in these regions contains non heat recoverable segments, facilitate obtaining this highly desirable result.

FIG. 11 shows a section along the longitudinal axis of the case. The central cavity 86 serves to contain the individual spliced wires from the cables. Optionally and advantageously, there is present a small container 95 (filled with a drying agent) whose walls permit water to diffuse through at a rate in excess of the diffusion rate into the splice case internal cavity, as will be explained in greater detail hereinafter. Valve means can be provided affording access to cavity 86 enabling pressure testing of the installed splice case.

The preferred method of fabrication of a splice case, with particular reference to the embodiment of FIGS. 8 through 11, is hereinafter described and further illustrated in FIGS. 12 through 21.

The electrode material, preferably a metallic braid, which may be, for example, formed from 16 carriers each of four strands of 38 awg tinned copper wire braided at as high a braid angle as possible (to achieve a high degree of compliability) is formed around a thin conductive or nonconductive thermoplastic tube. Excellent results have been obtained with a braid angle of 75° around a 0.25 inch o.d. 10 mil wall tubing of the same composition as the constant wattage material. The braided tube is then heated to or above the softening temperature of the thermoplastic tube and flattened, care being exercised to prevent stretching of the braid. These steps are shown in FIG. 12.

Figure 13:
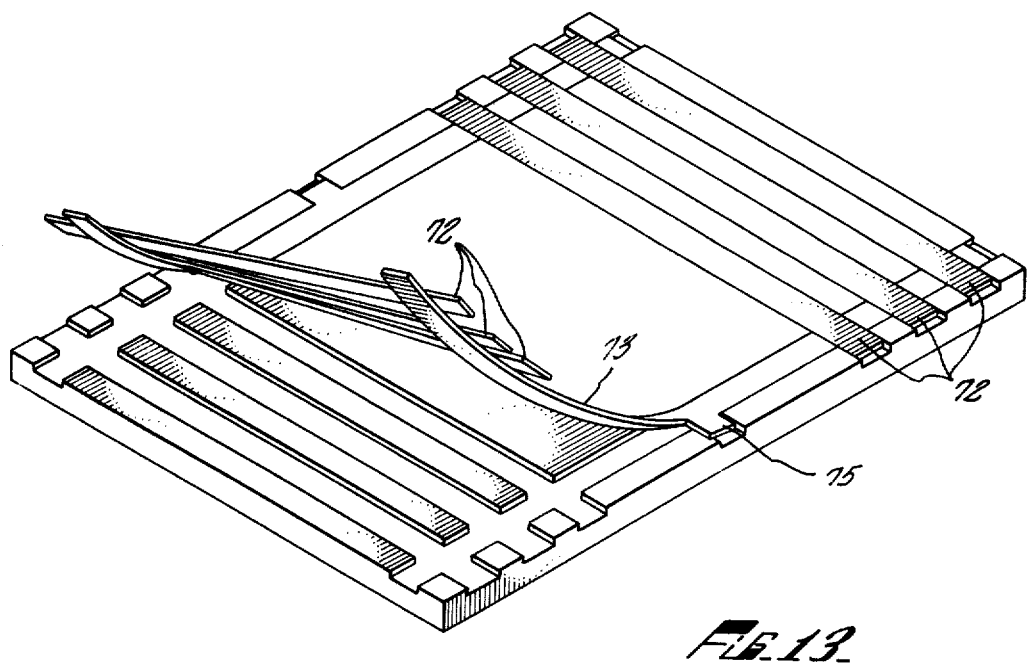

The next stage in the process is the construction of the electrode/buss system comprising the steps of affixing the tab 75 to the side electrode 73, followed by attachment of the end electrodes 72. Suitable affixing methods include spot welding, soldering and gluing. When the electrode comprises wire braid around a conductive core of the same material as the constant wattage layer, it has been found that excellent results are obtained by hot bonding using the conductive thermoplastic core to bond the electrodes together. Attachment of the electrodes to one another to form the basic configuration is facilitated by the use of a jig as shown in FIG. 13. The material used for the end electrodes, in addition to the flattened braid referred to hereinabove, may include knitted or woven or plaited metal wires, conductive fibers or metal plated polymeric fibers or polymeric fibers containing conductive particles which have been so treated as to render them highly conductive in the fiber direction.

It is preferred in all these embodiments that the resultant electrode be highly extensible and compliant so as not to offer any appreciable resistance to expansion or recovery of the heat recoverable portions of the splice case as occurs during manufacture and installation in service of the splice case.

Similar materials may be used for the side electrodes, however, as these electrodes are not required to undergo any significant deformation during manufacture and installation, they may additionally be formed out of such relatively non-extensible and noncompliant materials as flat metal or otherwise highly conductive strips, preferably perforated, and single or multiple stranded wires.

Figure 14:
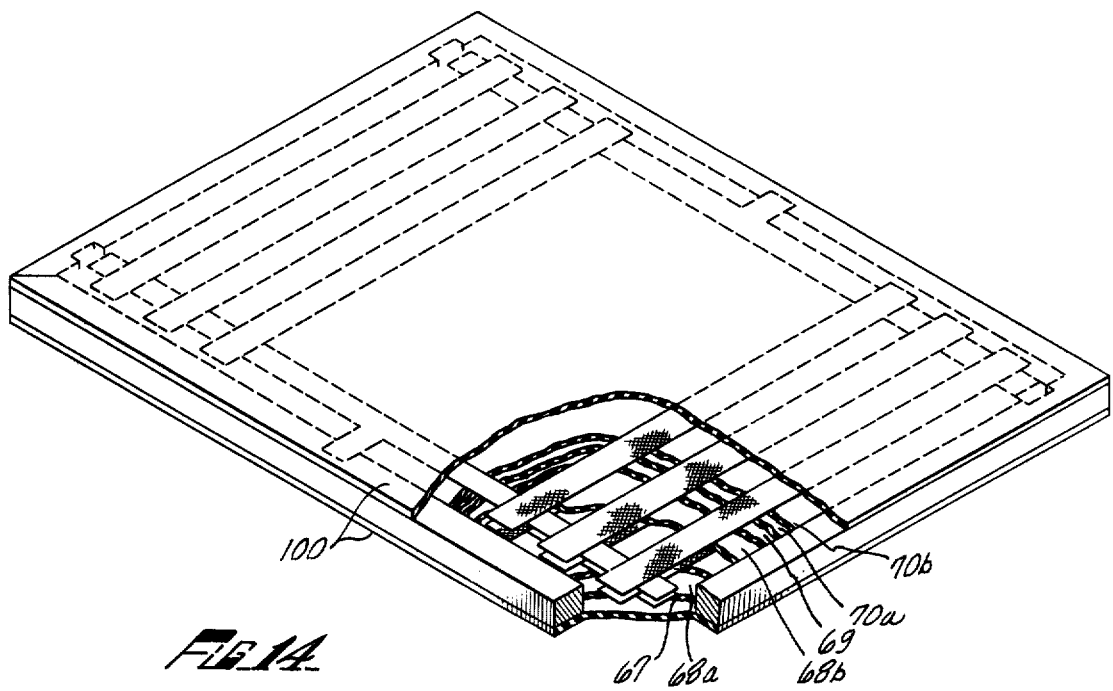
Figure 15:
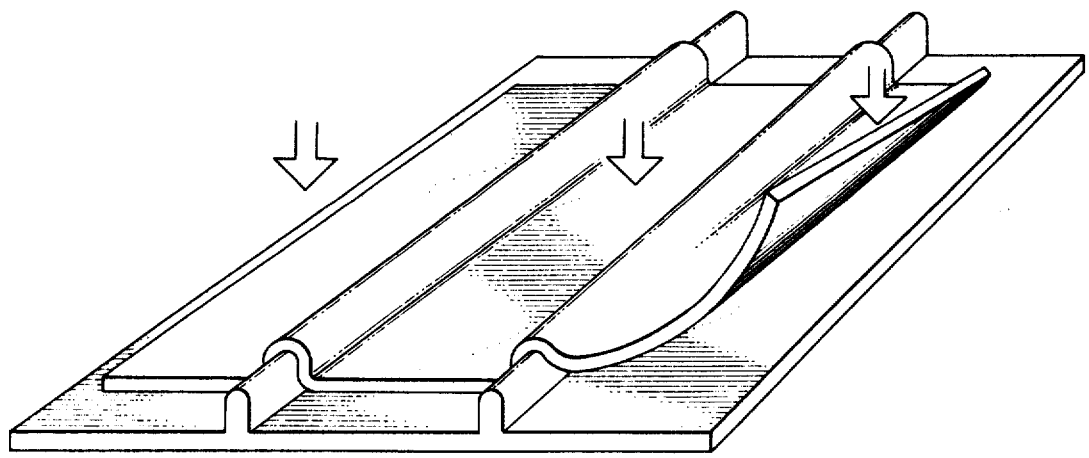
Figure 16:
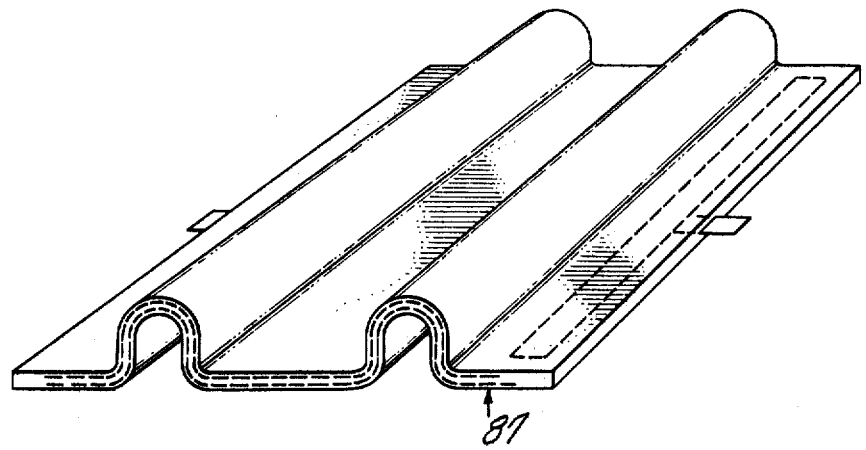

The construction of the blank for the splice case is shown in FIG. 14. The various heater layers, prepared by, for example, extrusion, coextrusion or hot calendering, are conveniently assembled in a jig frame. In the particular embodiment illustrated, a skin layer 67 is placed in the frame and successively a constant wattage layer 68a, the first set of electrodes 73/73a (with the tab 75 pointing to the right), another constant wattage layer 68b, the PTC control layer 69, another constant wattage layer 70a, the second set of electrodes 74/74a (with the tab 76 pointing to the left), and a final constant wattage layer 70b laid over. The whole structure is sandwiched between Teflon protective layers 97 and laminated together be heating under pressure. A jig is suitably used to hold the various layers and the electrodes in fixed relation to one another during lamination. For the same reason, a minimum of pressure is exerted during lamination. After lamination and removal of the Teflon layers, the assembled splice case blank is preferably sandwiched between foam rubber sheets 100 and annealed, for example, at about 370° F, for a sufficient period of time with minimum applied pressure to allow the constituent layers to relax thoroughly. Depending on the materials involved, annealing periods of as little as 2 minutes to over 1 hour are suitable, 5 minutes to 15 minutes being preferred. The blank is removed while still at the annealing temperatures and conformed over a male mold as in FIG. 15 using pressure as indicated by the arrows so as to form the unexpanded splice case configuration 87 shown in FIG. 16. In this operation, as previously, care should be taken to ensure that the heater is not stretched during the forming operation. If desired, a plurality of ridges, preferably wedge shaped, may be present on the upper surface of flanges 77, 78 and 79 which ridges serve to direct the compressive forces exerted by clamps 83 and 85.

The basic splice case configuration 87 is then irradiated with ionizing radiation using techniques well known to those skilled in the art to ensure uniform irradiation. Suitable ionizing radiations include gamma rays, X-rays, and accelerated electrons. The dose required should be sufficient to ensure integrity of the configuration above the crystalline melting point of any of its polymeric constituents but not sufficiently high as adversely to affect the elongation behavior during the expansion operation to form it into the heat recoverable configuration. A suitable irradiation dose range has been found to be 2 to 50 megarads, 5 to 20 megarads being preferred.

Figure 17:
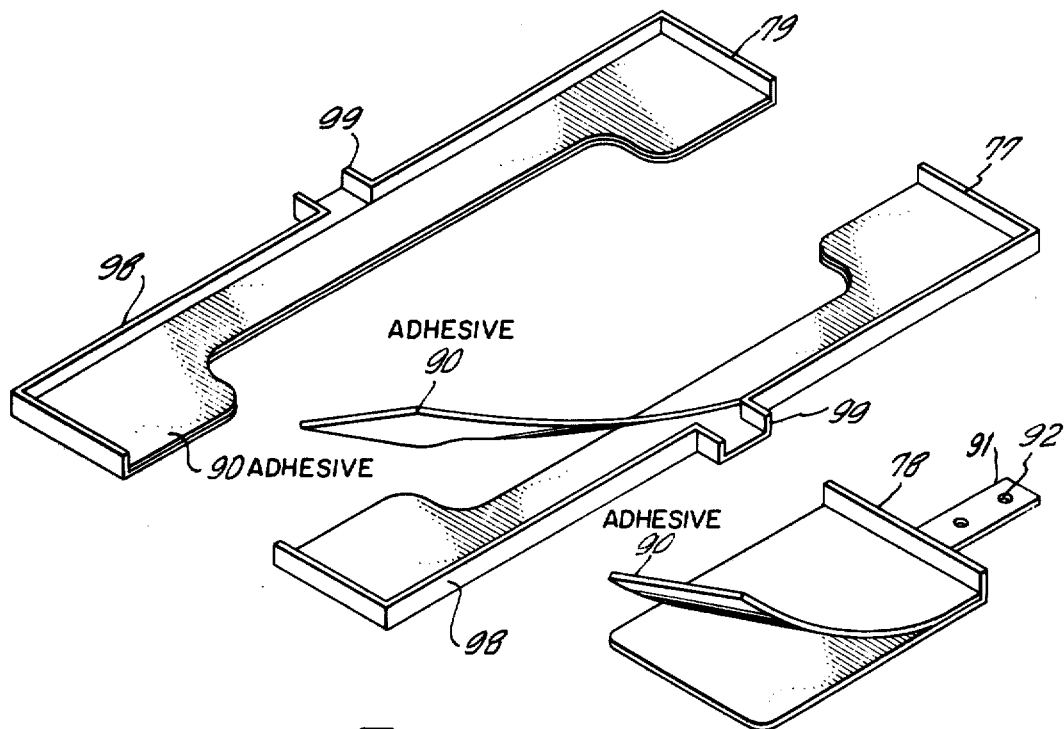
Figure 18:
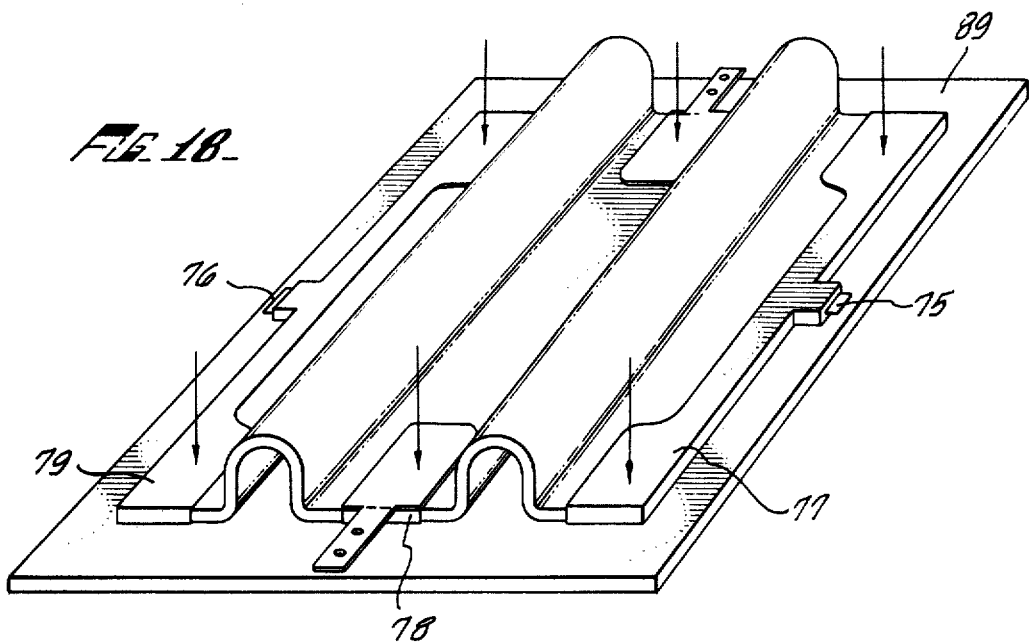
Figure 19:
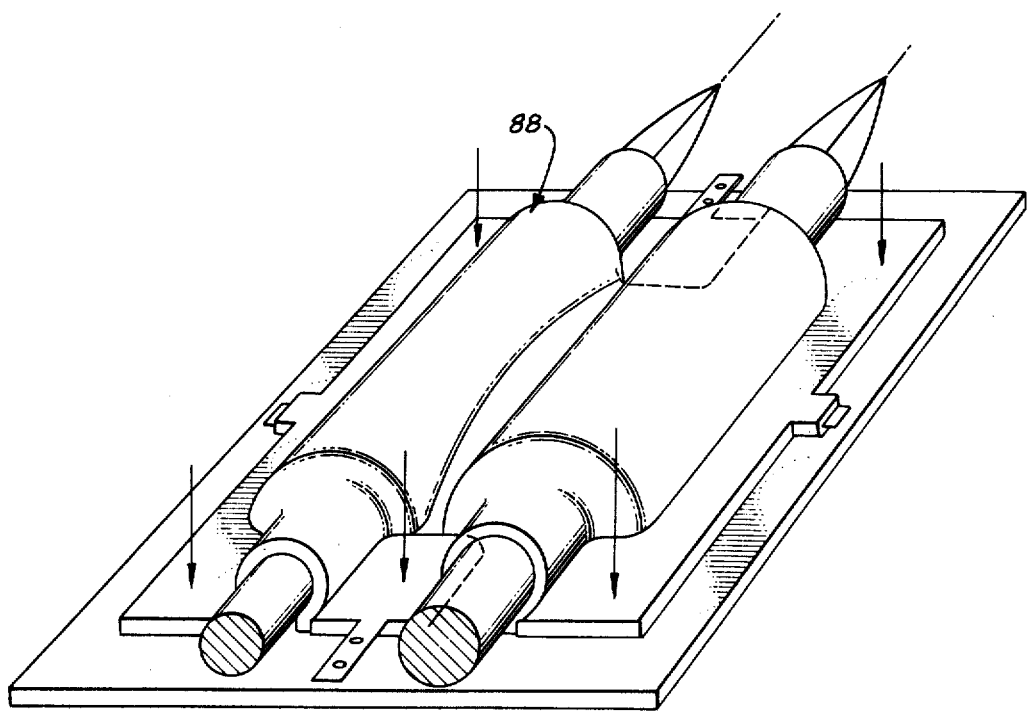
Figure 21:
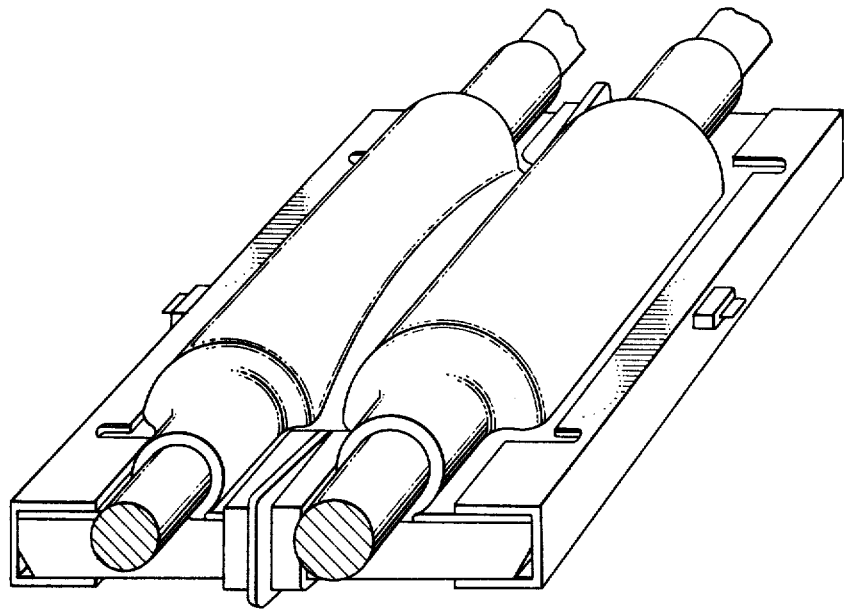
FIG. 21 shows the especially preferred embodiment after installation around a cable splice.

The blank which following irradiation may be considered to be in a "heat stable" configuration is then formed into the "heat recoverable" configuration 88 in the sequence of operations shown in FIGS. 17 through 19. After a preheat sufficient to warm the article 87 to about the melting point of its crystalline polymeric constituents, the formed blanks are inserted into a jig 89 as shown in FIG. 18. The reinforcing flanges 77, 78, and 79 which have their contacting surfaces coated with an adhesive 90 as shown in FIG. 17 are placed on the sides and ends of the formed blank 87. The end flange 78 (and its duplicate flange at the other end of the splice case) is made with a long "break off" tab 91 having locating holes 92 for mounting in the jig 89 as shown in FIGS. 17 and 18. All the flanges have turned down lips 98 at their outer edges to serve to contain and protect the edges of the heater from mechanical damage. The side flanges 77 and 79 have a small shroud 99 in the middle outside edge surrounding the electrode tabs 75 and 76 and sized to accept a standard quick disconnect type connector ¼ × 1/32 inches such as are supplied by the Arc-Less Company.

Pressure is applied to the side and end flanges and the splice case folds and central cavity are formed by suitable expansion means. Such expansion techniques are well known to the prior art and include mandrel expansion and pneumatic or vacuum forming. In this operation care should be taken to prevent longitudinal compression of the folds when a mandrel is used. Suitable means for minimizing such compression include provision of a radially expansible or circumferentially segmented sleeve member between the mandrel and the fold which serves to decouple the longitudinal insertion forces exerted by the mandrel from the folds. Alternatively pneumatic or hydraulic expansion of an elastomeric tube longitudinally constrained may be used. The central splice case cavity is preferably formed pneumatically. The expanded blank is then cooled while under constraint as in FIG. 19, removed from the jig and an adhesive layer 93 as shown in FIG. 20 affixed to the surfaces that will butt on to the lower member 80 and on to the interior surfaces of the folds (71). An adhesive layer can also be affixed to the abutting surface of member 80. At this stage if desired, a container 95 filled with a desiccant may be fixed to the inner wall of the central cavity 94 as shown in FIG. 20 which is a view of the completed upper heat recoverable member 96 where the relation of the folds and central cavity can be seen. Alternatively, the desiccant can be affixed to the base plate as shown in FIG. 11.

Due to the disposition of the electrodes in the splice case upper member and to the relative resistances of the constant wattage and PTC layers, on connection to a power source, for example, a 12 or 24 volt lead acid battery, heating to cause recovery and/or activation of the adhesive predominantly occurs at the folds and in the flange regions. Thus, the central cavity does not develop enough power to warm to a significant extent.

As has been mentioned hereinabove, the compositions used in the heater layers can be chosen so as to provide extremely quick heating of the splice case. For example, using the preferred PTC compositions of the type hereinabove referenced, we have found that the heater in the fold area typically heats to 115° - 120° C in less than 1 minute. On reaching such temperature the fold regions start to recover. In about 2 minutes the fold regions have shrunk around the substrate, e.g., cable, and after a further eight to thirteen minutes the adhesive layers have been thoroughly activated and have wet and sealed to the cable jacket and to the non heat recoverable base member. Thus, in a typical instance the heater is appropriately connected to a power source for from about ten to fifteen minutes. Those skilled in the art will realize that the period of time the heater is under power will vary according to the temperature demands of the adhesive, the thermal load and other factors. Suprisingly, we have found that the period of time required is relatively insensitive to the ambient temperature of the environment. It is believed that this may be due to the extremely sharp PTC cut off which the particular advantageous design combination of the instant invention has enabled us to use.

After completion of the splices and incorporation into the splice case, the complete splice case is assembled, as above described, by bringing the upper and lower members 96 and 80 together and securing with the side clips 83 and 85 and end clips 84. The heater is then electrically connected to a power source also as described above. After an appropriate period of time, the electrical power source is removed and the splice case allowed to cool to ambiant temperatures. At this time the side and end clips may be removed or optionally left in place to provide additional mechanical protection if desired.

A particularly advantageous result of the combination of elements in the instant invention is that because the heater is caused to maintain itself in a particularly limited range of temperatures whatever the environmental thermal load, said temperature range being very close to the melting points of commonly used thermoplastic cable jacketing or individual wire insulating materials, even if the splice case is left electrically connected to a power source for periods of several hours after the joint has been made, no damage to the telephone wires or cables results.

The particular advantages of the desiccant configuration will now be described. As mentioned hereinabove, excess humidity leads to an unacceptable level of paper insulated wire performance. At 30% relative humidity (R.H.) and at 15° C the insulation resistance of paper insulated strands such as are often used in telephone cables decreases to an unacceptable level of about 0.5 giga ohm per kilometer. Below 30% R.H., performance is acceptable. Thus, the humidity inside the splice case need not be maintained at as low a value as possible but simply maintained below 30% under all circumstances, a fact not apparently realized by the prior art. Thus, we derive unexpected and surprising benefits from encapsulating the desiccant in a container whose water vapor transmission characteristics have been carefully matched to those of the splice case itself so as to maintain the relative humidity inside the said splice case at less than 30% whatever the relative humidity outside, as the following example demonstrates.

For 100% R.H. outside and 0% R.H. inside, if a typical splice case of the instant invention has a moisture vapor transmission (MVT) of 100 μg/hr at 15° C, the container for the desiccant must have a MVT > 100 μg/hr at 30% R.H. or > 333 μg/hr at 100% R.H. Thus, if the desiccant container has a MVT of 500 μg/hr, the requirement is satisfied.

Assume the container holds about 100 g. of desiccant such as silica gel which absorbs about 50g water. Under shelf storage conditions at 100% R.H. with no other protective covering the desiccant thus contained will lose half its absorptive capacity in about 6 years. Thus, a container of this type permanently affixed inside the splice case will suffer no appreciable diminution in effectiveness even if the splice case is removed from its protective wrapping during storage and periods of many months elapse before it is used.

An especially useful feature of the self-heating splice cases of the instant invention is their re-enterability, achieved by merely electrically connecting the installed splice case to an electrical power source, waiting a few minutes to soften the adhesive, removing the electrical contacts and the side and end clip members (if they have been left on) and separating the upper and lower splice case halves. If desired, after necessary changes to the individual splices or replacement of any component, the whole splice case may be reassembled as before and a short period of reconnection to an electrical power source will result in a reforming of the adhesive bonds to yield an assembly of unimpaired structural integrity. This ease of re-enterability means that if not all the cable folds are required at the initial installation, a plug or plugs may be used, sized to maintain the redundant folds in an expanded condition during initial installation. On subsequent reentry, additional cables can be added at any time and any newly added components sealed as effectively as any of the original components. Reentry of the non self-heating splice cases can also be effected by use of an external heat source to melt the adhesive.

In a particularly preferred embodiment of the instant invention PTC compositions disclosed by Horsma et al in U.S. Pat. application Ser. No. 510,035 filed Sept. 27, 1974 now abandoned and in a C.I.P. thereof filed on even date herewith Ser. No. 601,639, entitled "Positive Temperautre Coefficient of Resistance Compositions" are used. Such compositions comprise blends of thermoplastic and elastomeric materials having conductive materials dispersed therein. As pointed out in the above specifications, such blends exhibit a steep rise in resistance at about the melting point of the thermoplastic component, the resistance continuing to rise with temperature thereafter. Because of the increased safety margin given by the further increases of resistance above the melting point, such heaters can be designed to control at temperatures above $T_s$ and resistances well in excess of that at $T_s$ but yet avoid the risk of thermal runaway and/or burn out which occurs when prior art PTC compositions are used in such designs. Such heaters, especially when the increase in resistance with temperature above $T_s$ is very steep, are very "demand insensitive" that is, the operating temperature of the PTC material varies very little with thermal load. They can also be designed to generate very high powers up to $T_s$ when electrically connected to a power source. Because of their excellent temperature control, they can be employed to activate adhesives and cause heat recoverable devices such as the instant invention to recover around substrates such as thermoplastic telephone cable jackets without fear of melting or deforming the substrate even if left connected for considerable periods of time.

In this preferred embodiment, referring again to FIG 8, a heater PTC core 69 in accordance with the teaching of Horsma et al is combined with constant wattage outer layers 68 and 70 of compositions whose thermoplastic polymer ingredients, if any, have a lower melting point than that of the thermoplastic polymer component of the PTC composition. The constant wattage layers, if comprising thermoplastic polymers, can be made heat recoverable and preferably an additional outer shell 68 comprising a layer of a heat recoverable polymer composition having a recovery temperature less than the melting point of the thermoplastic component of the PTC composition is also provided. An additional layer 71 of a hot melt adhesive or mastic may also be provided, the hot melt, if used, having a melting point similar to that of the heat recoverable member and an activation temperature less than the melting point of the thermoplastic component of the PTC composition. Such an embodiment has been found to be particularly advantageous where the substrate is heat sensitive i.e. where if warmed above its melting point, it will deform or flow.

The apparatus of this invention can be used to quickly and safely seal cables or the like. Two leads from the apparatus can be easily connected to a power source, such as a 12 or 24 volt battery, and because of the self-regulating feature, power can be applied for sufficient time to ensure that complete heating is taking place, yet constant inspection and supervision during the recovery operation is not required. The workman merely wraps the self-heating, self-regulating heat recoverable article around the cables or pipes to be sealed and connects it to a battery. He can then go on to another job, returning later after sufficient time has elapsed for adequate heating.

What is claimed:

1. A heat recoverable article having self-contained heating means comprising a conductive polymeric composition, said polymeric composition being capable of conducting sufficient current there through at a given voltage and exhibiting sufficient resistance to give a heat output capable of causing the heat unstable material to recover to its original form, said conductive polymeric composition being so configured that its length and width are substantially greater than its thickness and said conductive polymeric composition being adapted for connection to a power source such that the current will flow through its thickness, said article being further characterized as comprising a polymeric material which has been dimensionally changed from an original heat stable form to a heat unstable form capable of moving in the direction of its original form upon the application of sufficient heat and being so configured that it can be positioned around a splice to be sealed.

2. The article of claim 1 wherein the heat unstable polymeric material comprises a polymeric component of the conductive polymeric composition.

3. The article of claim 1 wherein the conductive polymeric composition comprises a polymer having dispersed therein conductive carbon particles.

4. The article of claim 1 wherein there is affixed to the surface of the article which is to be disposed towards the splice to be sealed a container of desiccant, the water vapor transmission characteristics of said container relative to that of the article for sealing a splice being such as to maintain the relative humidity at less than about 30% within the cavity formed when said article is caused to heat recover around a splice.

5. An article according to claim 1 wherein said polymeric composition exhibits a positive temperature coefficient of resistance.

6. A heat recoverable tubular article for sealing joints having self-contained and self-regulating heating means comprising a conductive polymeric heating composition exhibiting a positive temperature coefficient of resistance and having sufficient heating capacity when connected to an electrical power source, to cause at least a heat recoverable portion of the tubular article to recover around and seal a joint therebeneath.

7. The article of claim 6 having on its inner surface a heat activatable adhesive or sealant to further seal the joint.

8. An article according to claim 6 wherein said conductive polymeric composition is so configured that its length and width are substantially greater than its thickness and said conductive polymeric composition is adapted for connection to said power source such that current will flow through its thickness.

9. A heat recoverable closure member having self-contained and self-regulating heating means and being adapted to heat recover around and seal a splice comprising a conductive polymeric heating composition, said composition exhibiting a positive temperature coefficient of resistance and having sufficient heating capacity when connected to an electrical power source to cause a heat recoverable portion of the closure member to heat recover, said closure member having first and second edges adapted to be brought together to form a tubular member and means for engaging said edges, said means maintaining said edges together during heat recovery.

10. The closure member of claim 9 wherein the polymeric heating composition comprises a crystalline thermoplastic material having dispersed therein particulate carbon black.

11. The closure member of claim 9 having on its inner surface a heat activatable adhesive or sealant to further seal said splice.

12. The closure member of claim 9 wherein the tubular member so formed is adapted at its end to individually recover around and seal a plurality of cables, and said tubular member having a central portion adapted to seal a splice of the plurality of cables.

13. The closure member of claim 12 having positioned at the central inner portion of said tubular member a rigid, dimensionally stable member adapted to be positioned around a splice of the plurality of cables whereby upon heat recovery, the central portion of the tubular member conforms to the shape of said rigid member and the end of said tubular member recovers to the diameters of said cables.

14. A closure member according to claim 9 wherein said conductive polymeric composition is so configured that its length and width are substantially greater than its thickness and said conductive polymeric composition is adapted for connection to said power source such that current will flow through its thickness.

15. A heat recoverable closure member having self-contained heating means and being adapted to heat recover around a splice joining a plurality of members comprising a conductive polymeric heating composition having sufficient heating capacity when connected to an electrical power source to cause the closure member to heat recover, said closure member having first and second edges which can be brought together to form a tubular member and a means for engaging said edges, the means maintaining said edges together during heat recovery, said closure member having on its inner surface which is to contact the members joined by the splice activatable material suitable for bonding and sealing the members joined by the splice, and the closure having member at at least one end of the tubular member formed with a plurality of individual passages through which a plurality of member joined by the splice may be inserted, said plurality of passages recovering around and sealing the plurality of member joined by the splice upon heat recovery of the closure member.

16. The closure member of claim 15 having a central portion adapted to seal the splice of the plurality of members, and having at the central inner portion of said tubular member a rigid dimensionally stable member adapted to be positioned around the splice of the plurality of members whereby upon heat recovery, the central portion of the tubular member conforms to the shape of said rigid member.

17. A closure member according to claim 15 wherein said conductive polymeric composition is so configured that its length and width are substantially greater than its thickness and said conductive polymeric composition is adapted for connection to said power source such that current flows through its thickness.

18. A closure member according to claim 17 wherein said plural passages are defined by a plurality of heat recoverable folds in opposing portions of said member when said edges are joined.

19. A closure member according to claim 18 having rigid members affixed thereto outboard said folded portions.

20. A heat recoverable closure article having self-contained and self-regulating heating means and being adapted to be heat recovered around a joint comprising
  (a) a first layer of conductive polymeric material exhibiting a positive temperature coefficient of resistance,
  (b) at least one additional layer of conductive polymeric material adjacent a surface of said first layer exhibiting substantially constant resistance upon change in temperature to give a substantially constant wattage output at a given voltage,
  (c) electrodes positioned adjacent opposite surfaces of said first layer such that an applied current will flow through the thickness of said first layer; and at least one of said layers being heat recoverable, said layers being adapted so that the recovery of said heat recoverable layer upon the application of heat results in recovery of the other of said layers.

21. The closure article of claim 20 wherein a constant wattage output layer is positioned adjacent both surfaces of said first layer and said constant wattage output layers are in contact with said electrodes.

22. The closure article of claim 20 having a layer of electrically insulating material, and an inner layer of heat activatable adhesive, said adhesive being activated at the operating temperature of the heating means; and the closure article having first and second edges adapted to be brought together to form a tubular member and a means for engaging said edges, said means maintaining said edges together during heat recovery.

23. The closure article of claim 22 wherein the tubular member so formed is adapted at its end to individually recover around and seal a plurality of cables, and said tubular member having a central portion adapted to seal a splice of the plurality of cables.

24. The closure article of claim 23 having positioned at the central inner portion of said tubular member a rigid, dimensionally stable member adapted to be positioned around a splice of the plurality of cables whereby upon heat recovery, the central portion of the tubular member conforms to the shape of said rigid member and the end of said tubular member adapted to individually recover around and seal a plurality of cables recovers to the diameters of said cables.

25. The closure article member of claim 22 wherein the insulating layer is heat recoverable.

26. The closure article of claim 20 wherein the positive temperature coefficient of resistance layer comprises the heat recoverable layer.

27. The closure article of claim 20 wherein the heat recoverable layer comprises an additional adhesive layer, said adhesive being activatable at the heating temperature.

28. An article according to claim 20 that is tubular.

29. A process of heat sealing a joint between members without external heating means comprising the steps of:
   positioning around said joint to be sealed a heat-recoverable article having self-contained and self-regulating heating means comprising
   (a) a first layer of conductive polymeric material exhibiting a positive temperature coefficient of resistance,
   (b) a second layer of polymeric material adjacent a surface of said first layer having dispersed therein a conductive filler, said layers exhibiting substantially constant resistance upon change in temperature to give a substantially constant wattage output at a given voltage,
   (c) electrodes positioned adjacent opposite surfaces of said first layer such that an applied current will flow through the thickness of said first layer,
   (d) a third layer of electrically insulating material,
   (e) an inner layer of heat activatable material, said material being activated at the operating temperature of the heating article to bond to the members to be sealed, at least one of said layers being heat recoverable at the operating temperature of the article; and
   applying sufficient current to the electrodes to cause recovery of the heat recoverable materials and activation of the adhesive.

30. The process of claim 29 wherein the article is positioned around the joint by wrapping the article around said joint and engaging the edges of said article with a means sufficient to maintain said edges together during heat recovery.

31. A closure article, at least a portion of which is heat recoverable, said closure article having first and second edges adapted to be brought together to form a tubular structure having a central cavity portion and means for maintaining said edges together during heat recovery, the tubular structure so formed having plural openings at at least one end, said openings comprising heat recoverable folds in opposing portions of said article when brought together to form said tubular structure, being adapted to heat recover around and seal a plurality of cables to be inserted therein and a rigid dimensionally stable member disposed adjacent the inner surface of that portion of the tubular structure defining said cavity.

32. An article according to claim 31 wherein rigid members are affixed to said article outboard said folds.

33. A closure article comprising first and second members adapted to be brought together to form a tubular structure having a central cavity portion and plural openings at at least one end thereof, said openings being heat recoverable and adapted to seal a plurality of cables to be inserted therein upon the application of heat, said first member being heat recoverable and said second member being non-heat recoverable, said heat recoverable member having plural folds in a heat recoverable portion thereof defining said openings, said folds being supported by said non-heat recoverable member.

34. A closure article according to claim 33 wherein rigid members are affixed to said first member outboard said folds.

35. A closure article according to claim 34 having self-contained heating means comprising a conductive polymer composition and wherein said heat-recoverable folds comprise said conductive polymer composition.

36. A closure article according to claim 34 having self-contained and self-regulating heating means comprising a conductive polymer composition exhibiting a positive temperature coefficient of resistance and wherein said heat-recoverable folds comprise said conductive polymer composition.

37. A closure article according to claim 34 wherein said non-heat recoverable member is provided with plural ridges for insertion between said folds.

38. A closure article having self-contained and self-regulating heating means comprising first and second members adapted to be brought together to form a tubular structure having a central cavity portion and plural openings at at least one end thereof, said openings being heat recoverable and adapted to seal a plurality of cables to be inserted therein, said first member being heat recoverable and said second member being non-heat recoverable, said heat recoverable member having plural folds in a heat recoverable portion thereof defining said openings, said folds being supported on said non-heat recoverable member, said folds comprising:
   (a) a first layer of conductive polymeric material exhibiting a positive temperature coefficient of resistance,
   (b) at least one additional layer of conductive polymeric material adjacent a surface of said first layer exhibiting substantially constant resistance upon change in temperature to give a substantailly constant wattage output at a given voltage, and
   (c) electrodes positioned adjacent opposite surfaces of said first layer such that an applied current will flow through the thickness of said first layer; and
   at least one of said layers being heat recoverable, said layers being adapted so that the recovery of said heat recoverable layer upon the application of heat results in recovery of the other of said layers.

39. The closure article of claim 38 wherein a constant wattage output layer is positioned adjacent both surfaces of said first layer and said constant wattage output layers are in contact with said electrodes.

40. The closure article of claim 38 wherein the positive temperature coefficient of resistance layer comprises the heat recoverable layer.

41. The closure article of claim 38 wherein the heat recoverable layer comprises an additional adhesive layer, said adhesive being activatable at the heating temperature.

* * * * *